US008390266B2

(12) United States Patent
Franzan et al.

(10) Patent No.: US 8,390,266 B2
(45) Date of Patent: Mar. 5, 2013

(54) METHOD AND DEVICE FOR DETERMINING A REFERENCE POSITION OF A LOCKING PART MOVED BY AN ELECTRIC MOTOR

(75) Inventors: Günter Franzan, Vienna (AT); Martin Meissl, Vienna (AT)

(73) Assignee: Continental Automotive GmbH, Hannover (DE)

( * ) Notice: Subject to any disclaimer, the term of this patent is extended or adjusted under 35 U.S.C. 154(b) by 374 days.

(21) Appl. No.: 12/812,155

(22) PCT Filed: Oct. 28, 2008

(86) PCT No.: PCT/EP2008/064591

§ 371 (c)(1), (2), (4) Date: Sep. 15, 2010

(87) PCT Pub. No.: WO2009/086958

PCT Pub. Date: Jul. 16, 2009

(65) Prior Publication Data

US 2011/0006751 A1 Jan. 13, 2011

(30) Foreign Application Priority Data

Jan. 9, 2008 (DE) ........................ 10 2008 003 580

(51) Int. Cl.
*G01N 27/00* (2006.01)

(52) U.S. Cl. .................. 324/71.1; 324/137; 324/140 R; 324/143; 324/750.16; 324/750.22; 318/281; 318/265; 318/286; 318/466; 318/467; 49/71; 49/72

(58) Field of Classification Search ................ 324/71.1, 324/140 R, 143, 152, 750.16, 750.22; 318/281, 318/282, 264, 265, 286, 466, 467; 49/71, 49/72

See application file for complete search history.

(56) References Cited

U.S. PATENT DOCUMENTS 4,888,531 A 12/1989 Hormann ...................... 318/282
5,278,480 A * 1/1994 Murray ......................... 318/626
6,246,195 B1 * 6/2001 Kloesters ...................... 318/280

(Continued)

FOREIGN PATENT DOCUMENTS

DE 19534018 3/1997
DE 4339565 2/2000

(Continued)

OTHER PUBLICATIONS

German Office Action for Application No. 10 2008 003 580.7 (3 pages), Sep. 25, 2008.

International Search Report and Written Opinion for Application No. PCT/EP2008/064591 (11 pages), Feb. 25, 2009.

*Primary Examiner* — Huy Q Phan
*Assistant Examiner* — Thang Le
(74) *Attorney, Agent, or Firm* — King & Spalding L.L.P.

(57) ABSTRACT

In a method and a device for determining a reference position of a locking part moved by an electric motor, the locking part is moved in the direction of the closed state thereof, until the same reaches a stop position. At that location the meter reading of a position meter describing the stop position is detected and buffered. Subsequently a movement of the locking part is carried out in the direction of the opened state thereof. The locking part is then moved again in the direction of the closed state thereof, until it again reaches a stop position. At that location a meter reading describing the stop position is detected, and compared to the buffered meter reading. If both meter readings agree, the first stop position is determined as the reference position. The method and device can be utilized, for example, for power window lifts and sunroofs of motor vehicles.

20 Claims, 1 Drawing Sheet

U.S. PATENT DOCUMENTS

| | | | | |
|---|---|---|---|---|
| 6,833,681 | B2 * | 12/2004 | Fitzgibbon | 318/286 |
| 2002/0152013 | A1 * | 10/2002 | Knab et al. | 701/49 |
| 2006/0254148 | A1 * | 11/2006 | Noro et al. | 49/352 |
| 2007/0003258 | A1 * | 1/2007 | Franzan | 388/803 |
| 2007/0039243 | A1 * | 2/2007 | Theile et al. | 49/360 |

FOREIGN PATENT DOCUMENTS

| | | |
|---|---|---|
| DE | 4432955 | 10/2002 |
| EP | 0544135 | 6/1993 |

* cited by examiner

METHOD AND DEVICE FOR DETERMINING A REFERENCE POSITION OF A LOCKING PART MOVED BY AN ELECTRIC MOTOR

CROSS-REFERENCE TO RELATED APPLICATIONS

This application is a U.S. National Stage Application of International Application No. PCT/EP2008/064591 filed Oct. 28, 2008, which designates the United States of America, and claims priority to German Application No. 10 2008 003 580.7 filed Jan. 9, 2008, the contents of which are hereby incorporated by reference in their entirety.

TECHNICAL FIELD

The invention relates to a method and a device for determining a reference position of a locking part moved by an electric motor.

BACKGROUND

This locking part typically involves a side window of a motor vehicle driven by an electric motor or the sliding roof of a motor vehicle or a garage door driven by electric motor.

Window lift systems and sliding roof system of motor vehicles are often equipped with an anti-trap mechanism. The function of this mechanism is for example to avoid a hand of a person becoming trapped or to limit the closing force. This anti-trap mechanism includes a mechanical system and control electronics in each case.

Position information is determined during a movement of the locking part in the direction of its opened or its closed state. This information is typically determined using Hall sensors, which detect the rotation of the rotor shaft of the electric motor driving the locking part and output the rotational speed pulses to the control electronics.

In order to obtain a reference position for the position determination specified above, it is already known that the locking part can be moved for example in the direction of its closed state until it reaches a stop position and this stop position can be used as the reference position.

To enable this type of system to be constructed in a simple and cost-effective manner often only a stop position on one side is used, corresponding for example to the closed state of the locking part.

With such a system the problem arises of ensuring that the stop of the looking part actually involves a stop at a mechanical resistance defining the closed position of the locking part and not the locking part stopping against a foreign body, for example a hand of a person. If the stop involves the stop at a foreign body then an incorrect position is fixed as the reference position. This leads to the movement path of the locking part assumed by the control device differing from the actual existing movement path. This can lead to a malfunction of the system, with damage or even destruction of mechanical and/or electrical components of the system also occurring as a result of this malfunction. Injuries to a person whose hand for example gets in the way of a closing motor vehicle window can also not be excluded if the reference position is incorrectly fixed for position measurement.

A method for operating an electric motor-driven window lift for a motor vehicle is known from DE 44 32 955 C2. With this known method, after a button is pressed for the window lift movement the reaching of the window closed position is determined by a motor-stopped sensor. Furthermore an automatic surplus force limitation is provided which on activation initiates stopping and reversing of the direction of the window lift movement. Furthermore in special operating cases such as the end of a power failure for example, signals are generated to restore normal operation. In addition, to make do without a further button for establishing normal operation, first signals which represent the special operation cases and second signals which represent predetermined sequences of actuations of the button for restoring normal operation are fed to a motor controller with memory facilities.

SUMMARY

According to various embodiments, a method and a device for determining a reference position of a locking part moved by an electric motor can be specified in which an incorrect fixing of a reference position is avoided.

According to an embodiment, a method for determining a reference position of a locking part moved by an electric motor, may comprise the following steps: S1: Moving the locking part in the direction of its closed state while simultaneously changing the counter state of a position counter until a first stop position of the locking part is reached, S2: Detecting and buffering the counter state of the position counter describing the first stop position, S3: Moving the locking part in the direction of its opened state, S4: Moving the locking part in the direction of its closed state again until a second stop position is reached, S5: Detecting a counter state of the position counter describing the second stop position, S6: Checking whether the counter states describing the two stop positions match, and S7: Fixing the first stop position as the reference position if a match between the counter states is recognized.

According to a further embodiment, a match between the counter states can be recognized as existing if the difference between the two counter states is less than a predetermined threshold value. According to a further embodiment, According to a further embodiment, an anti-trap mechanism can be activated before the locking part is moved in the direction of its closed state. According to a further embodiment, the movement of the locking part in the direction of its closed state until a stop is reached may be repeated a number of times. According to a further embodiment, the movement of the locking part in the direction of its closed state until it reaches a stop may be repeated a number of times with changed parameters of the anti-trap mechanism, before the reference position is fixed. According to a further embodiment, the method may be ended if there is no match between the two counter states. According to a further embodiment, the method may be executed again if the two counter states do not match. According to a further embodiment, the method may be executed again with changed parameters of the anti-trap mechanism if the two counter states do not match.

According to another embodiment, in a device for determining a reference position of a locking part moved by an electric motor, with a motor movement detection device, a position counter and a control unit, the control unit can be provided for controlling the following steps: S1: Moving the locking part in the direction of its closed state while simultaneously changing the counter state of a position counter until a first stop position of the locking part is reached, S2: Detecting and buffering the counter state of the position counter describing the first stop position, S3: Moving the locking part in the direction of its opened state, S4: Moving the locking part in the direction of its closed state again until a second stop position is reached, S5: Detecting a counter state of the position counter describing the second stop position, S6: Checking whether the counter states describing the two stop positions match, and S7: Fixing the first stop position as the reference position if a match between the counter states is recognized.

According to a further embodiment of the device, the control unit may recognize a match between the counter states as being present if the difference between the two counter states is less than a predetermined threshold value. According to a further embodiment of the device, the control unit may activate an anti-trap mechanism before moving the locking part in the direction of its closed state. According to a further embodiment of the device, the control unit may repeat the movement of the locking part in the direction of its closed state until it reaches a stop a number of times. According to a further embodiment of the device, the control unit may repeat the movement of the locking part in the direction of its closed state until it reaches a stop a number of times with changed parameters of the anti-trap mechanism before fixing the reference position. According to a further embodiment of the device, the control unit may end the method if there is no match between the two counter states. According to a further embodiment of the device, the control unit may carry out the method again if there is no match between the two counter states. According to a further embodiment of the device, the control unit may carry out the method again with changed parameters of the anti-trap mechanism if there is no match between the counter states.

BRIEF DESCRIPTION OF THE DRAWINGS

Further advantageous characteristics of the invention emerge from explanation of examples which refer to the figures. The figures show.

DETAILED DESCRIPTION

The advantages of the various embodiments lie especially in the fact that setting an incorrect reference position is prevented. Furthermore the various embodiments make possible the use of an anti-trap system even during determination of the reference position. The method according to various embodiments can execute automatically. No user activity is required for executing the method, in particular a button does not need to be pressed. For example the method can be activated automatically within the framework of a diagnostic task in automotive plants and motor vehicle workshops. A method in accordance with various embodiments can also be executed in conjunction with learning processes of the force curves of window lift systems and sliding roof systems, with these learning processes able to be carried out in the plant but also as part of a subsequent visit by the motor vehicle to a workshop.

To cater for any slight tolerances which may arise, in the claimed method a matching of the counts of the position counter is recognized as being present if the difference between the counts compared to one another is less than a predetermined threshold value.

To increase the security of a correct fixing of the reference position the locking part is advantageously moved a number of times in the direction of its closed state and the associated counter state of the position counter on reaching the respective stop is evaluated.

This repeated movement of the locking part in the direction of its closed state can advantageously be repeated a number of times with changed parameters of the anti-trap system especially with anti-trapping which increases from closing process to closing process. This means that the probability of the occurrence of injuries to a person placing their hand in the path of the locking part is reduced.

If in the claimed method, as part of the check as to whether the counter states of the position counter compared to one another match, no match is determined, then this method can be ended or automatically carried out once again or carried out once again with changed parameters of the anti-trap mechanism.

Figure 1:
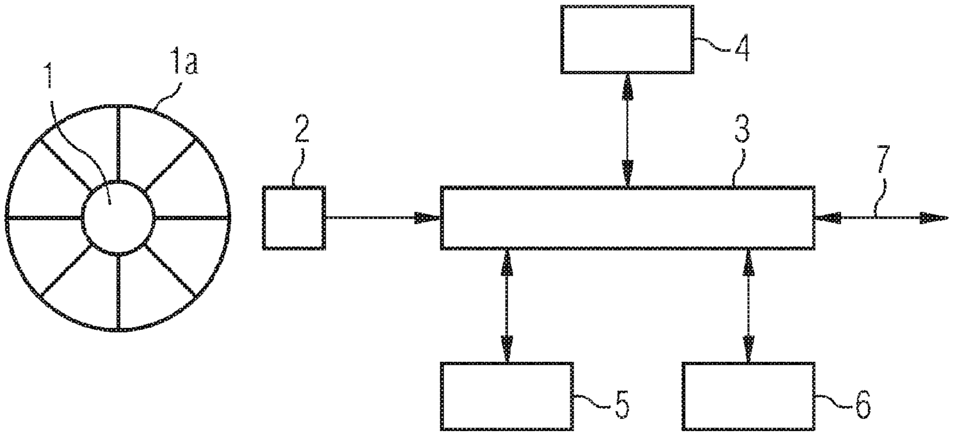
FIG. 1 a block diagram of a device for determining the reference position of a locking part of a motor vehicle moved by an electric motor and FIG. 2 a flow diagram to illustrate a method for determining a reference position of a locking part of a motor vehicle moved by an electric motor.

FIG. 1 shows the block diagram of a device for determining a reference position of a locking part of a motor vehicle moved by an electric motor. In the exemplary embodiment shown this locking part involves the window pane provided in the driver's door of the motor vehicle. The raising and lowering of this window pane is undertaken by means of an electric motor which has a stator and a rotor.

The rotor contains a rotor shaft 1 to which a generator wheel 1*a* is fixed non-rotationally. The generator wheel 1*a* has coding sectors or poles. When the rotor shaft with the generator wheel attached to it is turned impulse signals are detected by a sensor array 2 and fed to a control unit 3 which is formed by a microcomputer. The control unit 3 changes the position count stored in a position counter 4 each time an impulse is received so that the count of the position counter 4 always exactly describes the instantaneous position of the window pane.

The control unit 3 is connected via a bus 7 to one or more further control units of the motor vehicle.

Furthermore the device shown features a first memory 5. This memory 5 is a non-volatile memory, for example an EEPROM. Data is stored in this first memory 5 which corresponds to a force-travel reference curve. This data has already been determined during the manufacturing of the motor vehicle in the plant and is stored in non-volatile form in the first memory 5. This data is individually assigned to the respective window lift drive and contains information about the force which must be applied by the motor at a particular window position to close the respective window pane.

Furthermore the device shown in the figure has a second memory 6. This can involve a volatile memory, for example a RAM or the main memory of the control unit 3 realized as a microcomputer. Stored in the second memory 6 is a force-travel actual value curve determined during motor vehicle operation for each opening and closing of the window pane.

The control unit 3 uses the force-travel reference curve stored in the first memory 5 and the force-travel actual value curve stored in the second memory 6 to check whether counter errors have occurred during operation in relation to the counting of the pulses output by the sensor array 2, which have led to an incorrect count state of the position counter 4. If such a count error is detected it is compensated for by the control unit 3.

As an alternative, actual values determined can also be compared with the stored reference curve in order to establish whether count errors have occurred.

To determine the said force-travel reference curve a normalization of the system is first required, i.e. a determination of a reference position of the window pane moved by the electric motor. This reference position at which the counter state of the position counter 4 is preferably set to the value 0, is the closed state of the window pane in the exemplary embodiment shown.

Figure 2:
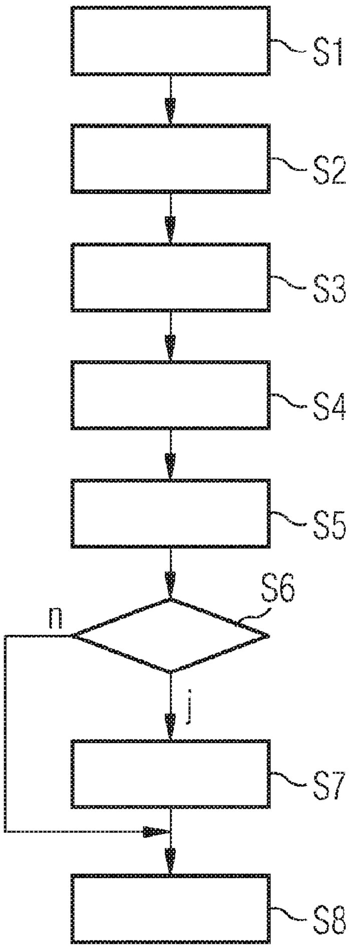

The starting point for the determination of this reference position is for example the open state of the window pane and this will be explained in greater detail below with reference to FIG. 2.

Starting from the open state of the window pane, under control by the control unit 3 in a step S1 the window pane is moved in the direction of its closed state until such time as it reaches a first stop position. During this closing movement of the window pane the counter state of the position counter 4 is reduced depending on the position impulses provided by the sensor array 2.

If the first stop position is reached the control unit 3 detects in a step S2 the counter state of the position counter 4 describing the first stop position and stores this counter state in a buffer. This buffering of the counter state describing the first stop position is undertaken for example in a main memory of control unit 3.

After this buffering of the counter state describing the first stop position, in a step S3, the control unit 3 controls a movement of the locking part in the direction of its opened state. This movement can be undertaken until the opened state is reached. During this opening movement of the window pane the counter state of the position counter 4 is increased depending on the position impulses provided by the sensor array 2.

Then, in a step S4, the control unit 3 controls a renewed movement of the window pane in the direction of its closed state until such time as a second stop position is reached. During this renewed closing movement of the window pane the counter state of the position counter 4 is again reduced depending on the position impulses provided by the sensor array 2.

If the second stop position is reached, the control unit 3 detects in a step S5 the counter state of the position counter 4 describing the second stop position.

Then the control unit 3 checks in a step S6 whether the counter state belonging to the first stop position matches the corresponding counter state of the second stop position or not. Within the framework of this checking a small tolerance is preferably permitted, which is expressed by a predetermined threshold value. If the control unit 3 detects that the difference between the two counter states is smaller than the predetermined threshold value, it then recognizes a match between the two counter states and in accordance with a subsequent step S7 it fixes the first stop position as a reference position. This reference position is assigned a new counter state 0 by the control unit 3. This new counter state 0 is also transferred as a reference counter state into position counter 4 and serves as an initial counter state for all subsequent window movements.

The method then moves to step S8 which represents the end of the method.

If the control unit 3 detects in step S6 however that the counter state corresponding to the first stop position does not match the counter state corresponding to the second stop position, a branch is made directly to step S8 which represents the end of the method.

The method described above has the following effects on the determination of the reference position of a locking part of a motor vehicle moved by an electric motor:

If in step S1 the locking part is moved into its closed state without encountering an obstacle beforehand, then the first stop position corresponds to the closed state of the locking part. If the locking card is then moved after execution of steps S2 and S3 in step S4 anew into its closed state, without encountering an obstacle beforehand, then the result of the check conducted in step S6 is that the two stop positions match and the control unit 3 fixes the first stop position which matches the second stop position in the correct manner as the reference position.

If on the other hand an obstacle, for example the hand of a mechanic or any other undesired obstacle, gets in the way of the closing window pane, then the first stop position does not involve the desired closed state of the locking part. This undesired obstacle can be pulled out of the path of the locking part during or after the execution of step S3. A result of this is that in step S4 the locking part arrives at a second stop position which corresponds to the desired closed state of locking part. In this case the second stop position is assigned a counter state other than that assigned to the first stop position. This is detected by the control unit 3 in step S6, so that the method branches directly from step S6 to step S8, i.e. to the end of the method. The result advantageously achieved by this is that no incorrect position is fixed as the reference position.

To avoid injury if the hand of the mechanic becomes trapped or to avoid damage to the mechanics of the motor vehicle if any other obstacle becomes trapped, in an advantageous manner the movement of the locking part in the direction of its closed state in steps S1 and/or S4 can be undertaken with an anti-trap facility controlled by the control unit 3 whereby for a movement of the locking part with a closing force movement no motor blocking must occur in the event of coming up against a stop Furthermore in accordance with an embodiment, the closing and opening processes of the window as well as the subsequent checking by the control unit can be undertaken several times in succession in order to further reduce the probability of the reference position not being correctly fixed. With this multiple execution of the closing and opening processes of the window the anti-trapping can be increased from step to step up to a desired final value.

In accordance with the exemplary embodiment described above, in the event of the two counter states not matching in step S6, a branch has been made to step S8 in order to end the method. In accordance with another exemplary embodiment not depicted in the figures, the control unit 3 in the event of the two counter states not matching, can also initiate an automatic restart of the method. This can if necessary be undertaken with changed parameters of the anti-trap mechanism.

What is claimed is:

1. A method for determining a reference position of a locking part moved by an electric motor, with the following steps:

(a) moving the locking part in a direction of its closed state while simultaneously changing a counter state of a position counter until a first stop position of the locking part is reached, (b) detecting and buffering the counter state of the position counter describing the first stop position, (c) moving the locking part in a direction of its opened state, (d) moving the locking part in the direction of its closed state again until a second stop position is reached, (e) detecting a counter state of the position counter describing the second stop position, (f) checking whether the counter states describing the two stop positions match, and (g) fixing the first stop position as the reference position if a match between the counter states is recognized.

2. The method according to claim 1, wherein the match between the counter states is recognized as existing if the difference between the two counter states is less than a predetermined threshold value.

3. The method according to claim 1, wherein an anti-trap mechanism is activated before the locking part is moved in the direction of its closed state.

4. The method according to claim 3, wherein the movement of the locking part in the direction of its closed state until a stop is reached is repeated a number of times.

5. The method according to claim 4, wherein the movement of the locking part in the direction of its closed state until it reaches a stop is repeated a number of times with changed parameters of the anti-trap mechanism, before the reference position is fixed.

6. The method according to claim 1, wherein it is ended if there is no match between the two counter states.

7. The method according to claim 1, wherein it is executed again if the two counter states do not match.

8. The method according to claim 7, wherein it is executed again with changed parameters of the anti-trap mechanism if the two counter states do not match.

9. A device for determining a reference position of a locking part moved by an electric motor, comprising a motor movement detection device, a position counter and a control unit, that wherein the control unit is operable to:

move the locking part in a direction of its closed state while simultaneously changing a counter state of a position counter until a first stop position of the locking part is reached, detect and buffer the counter state of the position counter describing the first stop position, move the locking part in a direction of its opened state, move the locking part in the direction of its closed state again until a second stop position is reached, detect a counter state of the position counter describing the second stop position, check whether the counter states describing the two stop positions match, and fix the first stop position as the reference position if a match between the counter states is recognized.

10. The device according to claim 9, wherein characterized in that the control unit recognizes the match between the counter states as being present if the difference between the two counter states is less than a predetermined threshold value.

11. The device according to claim 9, wherein the control unit activates an anti-trap mechanism before moving the locking part in the direction of its closed state.

12. The device according to claim 11, wherein the control unit repeats the movement of the locking part in the direction of its closed state until it reaches a stop a number of times.

13. The device according to claim 12, wherein the control unit repeats the movement of the locking part in the direction of its closed state until it reaches a stop a number of times with changed parameters of the anti-trap mechanism before fixing the reference position.

14. The device according to claim 9, wherein the control unit ends determining the reference position if there is no match between the two counter states.

15. The device according to claim 9, wherein the control unit carries out determining the reference position again if there is no match between the two counter states.

16. The device as claimed in claim 15, characterized in that the control unit carries out determining the reference position again with changed parameters of the anti-trap mechanism if there is no match between the counter states.

17. A system for determining a reference position of a locking part comprising an electric motor, a position counter, a control device coupled with the electric motor and the position counter, wherein the control device is configured to control the electric motor such that the locking part is moved in a direction of its closed state and to simultaneously change a counter state of the position counter until a first stop position of the locking part is reached, wherein the control device is further configured to detect and buffer the counter state of the position counter describing the first stop position and to move the locking part in a direction of its opened state and then in the direction of its closed state again until a second stop position is reached and to detect a counter state of the position counter describing the second stop position, and wherein the control device is further configured to check whether the counter states describing the two stop positions match, and then determines the first stop position as the reference position if a match between the counter states is recognized.

18. The system according to claim 17, wherein the match between the counter states is recognized as existing if the difference between the two counter states is less than a predetermined threshold value.

19. The system according to claim 17, further comprising an anti-trap mechanism which is activated before the locking part is moved in the direction of its closed state.

20. The system according to claim 19, wherein the movement of the locking part in the direction of its closed state until a stop is reached is repeated a number of times.

* * * * *